(12) United States Patent
Hausdorf et al.

(10) Patent No.: US 6,281,258 B1
(45) Date of Patent: *Aug. 28, 2001

(54) SPONGE

(75) Inventors: Jörg Hausdorf, Fürth; Eberhard Link, Dornhan, both of (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/233,309

(22) Filed: Jan. 19, 1999

Related U.S. Application Data

(62) Division of application No. 08/876,455, filed on Jun. 16, 1997, now Pat. No. 5,906,780.

(30) Foreign Application Priority Data

Jun. 14, 1996 (DE) ............................................. 196 23 703

(51) Int. Cl.⁷ .............................. A47K 7/02; A47L 13/16
(52) U.S. Cl. ........................................ 521/84.1; 15/244.1
(58) Field of Search ............................... 15/244.1, 244.4; 521/84.1

(56) References Cited

U.S. PATENT DOCUMENTS

| | | | |
|---|---|---|---|
| 1,142,619 | * 6/1915 | Pum et al. ............................. | 264/49 |
| 3,382,303 | * 5/1968 | Stieg ..................................... | 264/49 |
| 3,412,184 | * 11/1968 | Sharples et al. ...................... | 264/49 |
| 3,432,584 | * 3/1969 | Cannon et al. ........................ | 264/49 |
| 3,476,844 | * 11/1969 | Villain .................................... | 264/49 |
| 3,527,853 | * 9/1970 | Rowley et al. ........................ | 264/49 |
| 3,546,209 | * 12/1970 | Lipps, Jr. ............................... | 264/49 |
| 3,718,722 | * 2/1973 | Lee ........................................ | 264/234 |
| 4,173,613 | * 11/1979 | Rodier ................................... | 264/49 |
| 4,252,766 | * 2/1981 | Baldini et al. ......................... | 264/49 |
| 4,302,252 | * 11/1981 | Turbak et al. ......................... | 264/49 |
| 4,352,770 | * 10/1982 | Turbak et al. ........................ | 264/187 |
| 4,388,256 | * 6/1983 | Ishida et al. .......................... | 264/41 |

FOREIGN PATENT DOCUMENTS 2 284 421 * 6/1995 (GB) .

OTHER PUBLICATIONS

Ullmann's Encyklopadie der Technischen Chemie, vol. 18, pp. 175–177, Oct. 1967.*
Kirk–Othmer Encyclopedia of Chemical Technology, Third Edition, vol. 5, pp. 118–129, 1980.*

* cited by examiner

Primary Examiner—Allan R. Kuhns
(74) Attorney, Agent, or Firm—Kenyon & Kenyon

(57) ABSTRACT

A sponge of decrystallized cellulose modified by an acetyl group content, where the average degree of substitution is 0.2 to 1.5. No organic or inorganic sulfur compounds are present in the sponge. The sponge is produced by treating pulp with sodium hydroxide solution, then treating it with acetylating substances, drying and dissolving in an organic solvent with the addition of a pore-forming salt, fibers and optionally pigment dyes, pressing the mixture into a perforated mold whose receiving volume corresponds to the dimensions of the sponge to be produced, then placing the mold with its contents in boiling water, and removing the sponge thus formed in the mold.

6 Claims, No Drawings

SPONGE

This application is a division of application Ser. No. 08/876,455, filed Jun. 16, 1997, now U.S. Pat. No. 5,906,780.

BACKGROUND OF THE INVENTION

1. Field of the Invention

The invention concerns a sponge made of cellulose and a process for producing same.

2. Description of Related Art

Ullmann's Encyklopädie der technischen Chemie [Encyclopedia of Industrial Chemistry], $3^{rd}$ edition (1967), vol. 18, pp. 175–177, describes a method of producing spongy cellulose structures, where layers of pulp are swollen in a 15–20% NaOH solution that is present in excess. Then after a period of time, sodium cellulose is formed. The sodium hydroxide solution is then expressed; it contains in dissolved form hemicelluloses that would otherwise have an interfering effect on the following process steps. The remaining pressed cake in ground form is treated with carbon disulfide, forming cellulose xanthogenate, which dissolves smoothly in a NaOH solution, in which it is degraded after a period of time, with a reduction in the average degree of polymerization (DP). Depending on the grade of pulp used and the storage time, the DP is reduced from 800–1200 to 200–600.

The DP is defined as the average number of individual cellulose molecules of which a cellulose polymer chain is composed on the average.

The alkaline xanthogenate solution is then mixed with pore-forming Glauber's salt, cotton fibers and optional pigment and the mixture is stirred or kneaded until all the components are distributed uniformly. Then a mold that has closed walls and corresponds to the shape of the sponge is filled with the mixture and the mold is closed, but the closure still allows the liquid phase of the mixture to run off.

The mass in the mold is boiled for several hours in a coagulation bath at 100 C. The xanthogenate is cleaved and the pore-forming salt is leached out, forming a spongy structure in the mold. This spongy structure is washed in water and brought in contact with a small amount of 1% sulfuric acid solution to reduce the residual organic carbon disulfide and hydrogen sulfide compounds.

SUMMARY OF THE INVENTION

The object of this invention is to provide a sponge and a process for producing same, where there are no traces of the sulfur compounds mentioned above, in particular carbon disulfide and hydrogen sulfide, in the sponge. Another object of this invention is to prevent a reduction in the average degree of polymerization DP of the cellulose during the production of the sponge, to achieve higher strength values and increase the storage stability of the cellulose derivatives.

These and other objects of the invention can be achieved when the starting material for production is decrystallized low-substituted (DS 0.2 through 1.5) acetylated cellulose that is soluble in solvents or solvent systems based on dimethyl sulfoxide or dimethylacetamide. For this reason, derivatization with carbon disulfide need no longer be performed to dissolve the cellulose.

DETAILED DESCRIPTION OF THE INVENTION

Aqueous lye, 15 to 35 vol %, preferably NaOH solution, is poured over pulp, obtained mostly from wood and available commercially as a layered material, in a stirred vessel and left to rest for approx. 1 hour. The lye is preferably used in at least a four-fold excess, based on the dry weight of the starting pulp.

The time can be less than one hour if prior tests have ensured that swelling of the pulp is complete.

Then the lye is removed by squeezing to such an extent that the weight of the remaining pressed cake is three times the dry weight of the starting pulp. This pressed cake is ground to particle sizes less than 3 mm in diameter by means of a conventional beater mill or shredder mill and loosened in the process.

The particles are then placed in a stirred vessel, where a five-fold quantity of a liquid agent that has an acetylating action on sodium cellulose, i.e., the particulate material, is poured over the particles, and the mass is stirred for approx. 60 minutes.

Examples of agents that can be used include acetic anhydride, glacial acetic acid (anhydrous acetic acid) or acetyl chloride.

This causes esterification of free OH groups of cellulose by acetyl groups down to an average degree of substitution (DS) of 0.2 to 1.5.

The average degree of substitution DS indicates the number of OH groups that are substituted on the average by the average of three hydroxyl groups of the individual cellulose molecule in its polymer chain. This yields a maximum value of 3 and a minimum value of 0 for the DS.

Next the excess substitution agent, i.e., the liquid phase, is squeezed out of the solid mass with simultaneous removal of the liquid by suction. The residue, the cellulose derivative mass which is now in substituted form, is washed with water at least three times and then dried to a white powder at an ambient temperature of 100 C.

The cellulose derivative powder is then dissolved in a solvent or solvent system based on dimethyl sulfoxide or dimethylacetamide at 20 C. to 50 C. to a concentration of 4 to 12 wt %.

The preferred solvents (systems) have proven to be dimethyl sulfoxide (DMSO), DMSO/lithium chloride (chloride content 5 wt %), DMSO/magnesium chloride (chloride content 3 wt %), DMSO/N-methylmorpholine N-oxide or dimethylacetamide/lithium chloride. The inorganic chlorides serve as solubilizers. The dimethyl sulfoxide systems in particular have a good dissolving power, can be handled with no problems with regard to occupational safety and can be recovered easily from laboratory wastes.

Then 100 to 500 wt % anhydrous salt that serves as a pore-forming agent is added to this solution, which is defined as 100 wt %. Such salts are known per se; they are soluble in water and weak acids and do not enter into any interaction with the cellulose derivative.

In addition, the solution is mixed with 0.5 to 4 wt % fibers of natural or synthetic origin that are insoluble in the solvent used and optionally with up to 5 wt % conventional dyes, preferably pigment dyes.

The term "anhydrous" for the pore-forming salts is to be understood in the sense that they contain only bound water of crystallization at room temperature or none at all. One example is NaCl, which is available very inexpensively.

The resulting mixture is stirred or kneaded at room temperature until a homogeneous distribution of all components is obtained, which can be observed by the fact that when the dye is added it is distributed uniformly in the mixture. This process is usually concluded after 10 to 30 minutes.

The mixture is then transferred to the cavity of an open mold with porous, water-permeable walls. Pressure can be applied if the weight of the sponge per unit of volume is to be increased. The mold is then immersed in boiling water, where it remains until a cohesive foam structure has formed. The period of time required to accomplish this can be determined easily through preliminary experiments, where the complete dissolution of the pore-forming salt is also to be taken into account.

The mold is removed from the water bath and the finished sponge is washed in water until no residues of the solvent system or free dyes can be detected.

One variant of the process consists of the fact that, after the spongy structure is treated with boiling water, during or following the subsequent washing it is treated for two hours in 0.1 to 2 N aqueous sodium hydroxide solution at 50 C. while stirring. The acetyl groups present in the sponge are thus cleaved back and subjected to ester saponification. This process can also take place at room temperature, but the reaction is greatly accelerated at 50 C. and thus is more economical. The reaction can be carried out in an open apparatus. The pore structure of the sponge is not altered but this measure imparts the valuable property of extremely spontaneous wetting with water.

Acetic anhydride has proven to be an especially suitable acetylating agent because it is available at a low cost.

The sponge according to this invention does not contain any organic or inorganic sulfur compounds because sulfur atoms are not necessarily present in the solvent, where they remain chemically inactive.

Since there is no reduction in average degree of polymerization (DP) of the pulp used in this production method, raw materials with a high DP of up to 1200 can be used, so it is possible to produce sponges that resist the mechanical forces that occur in processing without any loss of strength.

The corresponding properties of the end products can be determined in advance through the choice of raw materials with their DP values without having to take into account the DP degradation step which is difficult to control.

Except for boiling with water at the end of the process according to this invention, all the treatment steps can be carried out at room temperature.

No toxic vapors or wastewater is formed during the production process.

The cellulose derivatives can be stored even for several months in the solvents mentioned above without any change in DP.

EXAMPLE

The invention is illustrated in greater detail on the basis of the following example. Commercially available pulp sheets with a DP of 600 are shredded into small pieces. Of this, 500 g are placed in a 5 L glass beaker and excess 22% NaOH solution is poured over the shredded pieces. After 30 minutes, the soda lye is removed by suction filtration through a glass frit and the remaining pulp is squeezed in a press at 50 bar.

The squeezed pulp is ground and excess acetic anhydride is poured over it in an apparatus equipped with a stirrer and a cooling device and stirred for half an hour. The solid mass is filtered out and washed with water until the pH of the wash water is neutral. Then the pressed cake is loosened, placed on a tray and dried at 100 C. until reaching a constant weight.

Then the DS is determined by saponifying the cellulose acetate with NaOH, titrating the excess NaOH back with HCl, and the DS is calculated from the NaOH consumption. A DS of 0.6 is obtained.

70 g of the dried cellulose acetate are placed first [in a vessel] and covered with 1167 g DMSO, stirred and dissolved. After 30 minutes, 10 g $MgCl_2$ are also added and likewise dissolved to make the color of the solution clearer.

This solution is transferred to a kneader. Then 23 g cotton fibers and 3 kg NaCl are added. The mixture is kneaded for one hour.

The homogeneous mass is pressed into a mold that is open at the top and has finely perforated walls, the mold is closed and boiled in a water bath for two hours.

The finished sponge is removed from the mold and rewashed with water. Then the sponge is placed in a 1 N NaOH solution and stirred for two hours at 50 C. to saponify the acetate groups again. This yields a sponge corresponding to the mold cavity with a density of 37 $kg/m^3$.

When the DP is determined again, it shows according to DIN 54,270 (dissolving the cellulose in iron tartarate solution and determining the specific viscosity with and without cellulose) that any reduction in DP in comparison with the initial state does not exceed the tolerance of the measurement method.

To test for the impurities carbon disulfide and hydrogen sulfide which are usually present, 200 mL water and 10 mL concentrated phosphoric acid were poured over 5 g sponge and boiled for three hours, then gaseous substances were expelled with inert gas. Hydrogen sulfide is precipitated with zinc sulfate and carbon disulfide was adsorbed on active carbon. Analysis revealed no trace of either $CS_2$ or $H_2S$.

What is claimed is:

1. A sponge comprising modified cellulose and natural or synthetic fibers, wherein the cellulose is present in decrystallized form, wherein the hydroxyl groups of the cellulose are substituted with acetyl groups, wherein the average degree of substitution (DS) is 0.2 to 1.5, and wherein no organic or inorganic sulfur compounds are present in the sponge, said sponge produced by a process comprising the steps of:

swelling a starting pulp obtained from wood in a stirred vessel by pouring 15% to 35% lye over the pulp;

leaving the pulp to soak for about one hour;

forming a pressed cake by squeezing out the lye until the weight of the pressed cake amounts to about three times the dry weight of the starting pulp;

grinding the pressed cake by milling to particle sizes smaller than 3 mm diameter;

pouring a liquid acetylating agent for sodium cellulose over the ground pressed cake in a stirred vessel to form a reaction mixture;

stirring the reaction mixture for about 60 minutes;

squeezing liquid out of the reaction mixture and leaving a solid cellulose derivative mass while removing the liquid by suction at the same time;

washing the resulting cellulose derivative mass with water;

drying the cellulose derivative mass at about 100° C. to yield a cellulose derivative powder;

forming a solution by dissolving the cellulose derivative powder at 20° C. to 50° C. in a solvent system based on dimethyl sulfoxide or dimethylacetamide to a yield of 4 to 12 wt %;

forming a mixture by adding to the solution, which is defined as 100 wt %:

a) 100 to 500 wt % of a water-soluble salt that is anhydrous at room temperature and is inert with respect to the cellulose derivative, as a pore-forming salt, b) 0.5 to 4 wt % fibers that are insoluble in the solvent, and c) up to 5 wt % colorants;

stirring or kneading the mixture at room temperature for 10 to 30 minutes until achieving a homogeneous distribution of all components;

introducing the mixture, with the desired higher volume weight of the sponge under pressure, into the cavity that corresponds to the later shape of the sponge in an open mold provided with perforated walls;

immersing the mold with the mixture therein into boiling water until a cohesive sponge body has formed;

taking the mold out of the water bath and removing the product;

washing the product with water to form the sponge.

2. The sponge according to claim 1, wherein after the treatment with boiling water and during or after the subsequent washing, the sponge is treated for about two hours in 0.1 to 2 N aqueous soda lye in an open vessel at 50° C. while stirring.

3. The sponge according to claim 1, wherein acetic anhydride is used as an acetylating agent.

4. The sponge according to claim 1, wherein the solvent system is selected from the group consisting of: dimethyl sulfoxide, dimethyl sulfoxide/lithium chloride, dimethyl sulfoxide/N-methylmorpholine N-oxide, and dimethylacetamide/lithium chloride.

5. The sponge according to claim 2, wherein the solvent system is selected from the group consisting of: dimethyl sulfoxide, dimethyl sulfoxide/lithium chloride, dimethyl sulfoxide/N-methylmorpholine N-oxide, and dimethylacetamide/lithium chloride.

6. The sponge according to claim 3, wherein the solvent system is selected from the group consisting of: dimethyl sulfoxide, dimethyl sulfoxide/lithium chloride, dimethyl sulfoxide/N-methylmorpholine N-oxide, and dimethylacetamide/lithium chloride.

* * * * *